Jan. 10, 1956 C. P. PORTERFIELD 2,730,602
APPARATUS FOR ELECTRICALLY ERODING MATERIALS
Filed Jan. 7, 1954
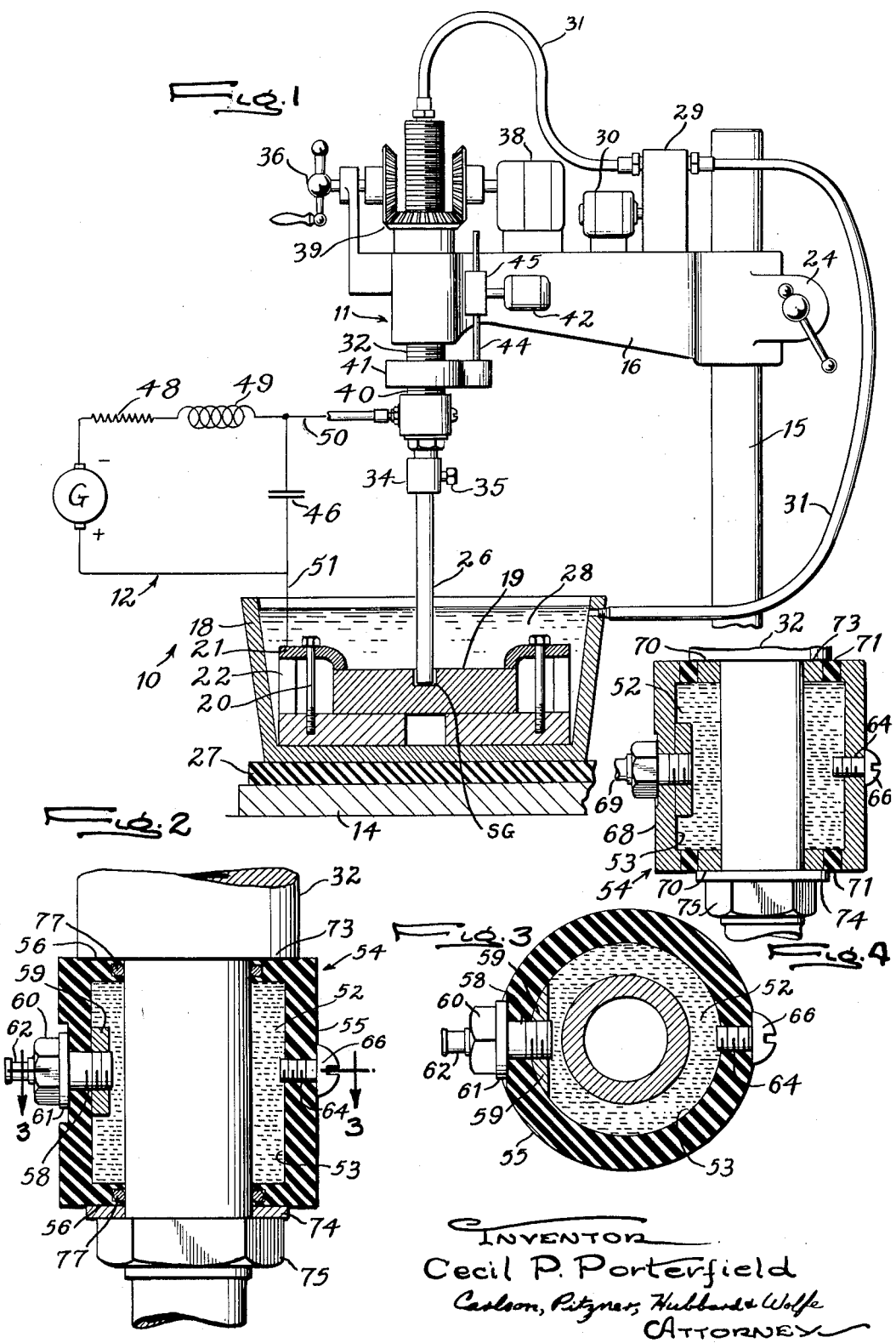
INVENTOR
Cecil P. Porterfield
Carlson, Pitzner, Hubbard & Wolfe
ATTORNEY

United States Patent Office 2,730,602
Patented Jan. 10, 1956

2,730,602

APPARATUS FOR ELECTRICALLY ERODING MATERIALS

Cecil P. Porterfield, Pittsburgh, Pa., assignor to The Method X Company, Pittsburgh, Pa., a corporation of Pennsylvania Application January 7, 1954, Serial No. 402,675

10 Claims. (Cl. 219—15)

This invention relates to apparatus for machining electrically conductive materials by electrical dislodgment of particles therefrom, the method being sometimes known as electro-erosion; and in particular this invention relates to an improvement in such apparatus.

Working of metals or other electrically conductive workpieces by electro-erosion may be accomplished by the application of a series of time-spaced electric spark discharges across a spark gap between an electrode, which serves as a tool, and a workpiece. During the spark discharge minute particles of the workpiece become dislodged therefrom in the region opposite the active end of the electrode, this action generating a machined contour in the workpiece. As such machining action progresses, the electrode may be fed with a rotary or translatory movement, or both, relative to the workpiece so as to maintain a gap between the electrode and workpiece of suitable length and at predetermined positions relative to the workpiece to produce a desired machined contour. A representative method and apparatus for working sintered carbides and other hard conductive materials by means of electro-erosion are disclosed in United States Letters Patent No. 2,650,979, issued September 1, 1953, on application filed by Edmund E. Teubner.

It is one object of the present invention to provide an electro-erosion apparatus of the foregoing type in which positive and continuous electrical contact is established between the electrode and source of electric power even though the electrode is rotated or translated in the apparatus relative to the workpiece.

Another object of the present invention is to provide an apparatus of the foregoing type in which electric current is supplied to a moving electrode without variation in the resistance of the electrical contact between the electrode and power source occasioned by the necessary rotation or translation of the electrode relative to the workpiece to effect the desired feed of the electrode.

A further object of the present invention is to provide an apparatus of the foregoing type in which the movable elements of the apparatus are protected against deterioration at the point of electrical connection with the power source.

It is a more detailed object of the present invention to provide an apparatus of the foregoing type in which a conductive fluid, such as mercury, is utilized to effect a positive and continuous electrical connection to the relatively movable parts of the apparatus.

Other objects and advantages will become apparent as the following detailed description proceeds, taken together with the accompanying drawings wherein:

Figure 1 is a view, partly in section and partly in elevation, showing an illustrative electro-erosion apparatus embodying the present invention, certain portions of the apparatus being represented diagrammatically.

Fig. 2 is an enlarged, fragmentary, vertical section of the spindle of the apparatus and an electrical connector or coupling embodying the present invention.

Fig. 3 is an enlarged horizontal section taken along the line 3—3 of Fig. 2.

Fig. 4 is a view similar to that shown in Fig. 2 but showing a modified form of electrical connector.

While the invention is susceptible of various modifications and alternative constructions, certain illustrative embodiments have been shown in the drawings and will be described below in considerable detail. It should be understood, however, that there is no intention to limit the invention to the specific forms disclosed, but, on the contrary, the intention is to cover all modifications, alternative constructions, and equivalents falling within the spirit and scope of the invention as expressed in the appended claims.

Referring more specifically to the drawings, an illustrative electro-erosion or spark machining apparatus 10 embodying the present invention is shown in Fig. 1. The apparatus 10 comprises a mechanical unit 11 and an electric power supply circuit 12. The latter is adapted to supply a series of unidirectional, time-spaced, electric spark discharges for application to the workpiece.

The mechanical unit 11 in the illustrative apparatus has a frame which comprises a base 14, an upright column 15, and a radial arm 16. The base 14 carries a container or reservoir 18 in which a workpiece 19 is secured by means of clamping screws 20, dogs 21, and spacers 22. The radial arm 16 may be adjustable vertically and horizontally on the upright column 15 to any desired position over the workpiece by the clamp 24. The outer or free end of the radial arm 16 carries a tool holding and feed mechanism for supporting and moving an electrode tool 26 relative to the workpiece 19. The workpiece 19 and its clamping means as well as the lower operative end of the electrode 26 are submerged in a pool of dielectric fluid 28, such as kerosene or transformer oil, contained in the reservoir 18. Upon application of the electric time-spaced discharges to the mechanical unit, the spark discharges occur across a spark gap SG between the submerged end portion of the electrode and the workpiece. The reservoir 18 may be electrically insulated from the frame as by a pad of non-conducting material 27. The dielectric fluid may be continuously circulated through the spark gap by means of a pump 29, driven by an electric motor 30, and conduits 31 interconnecting the reservoir 18 and the upper end of a tool holding spindle 32 which, together with the tool 26, may for convenience be hollow in construction to provide a passage for leading the dielectric to the lower operative end of the electrode tool 26. The conduits 31 are of insulating material to prevent electrical short circuit between the reservoir 18 and frame.

The tool holding and feeding mechanism of the apparatus may conveniently comprise a vertically disposed threaded spindle 32 carried by the radial arm 16 and journaled therein for relative axial sliding movement in a vertical direction. The lower end of the spindle 32 carries a chuck 34 which holds the electrode or tool 26. The shank end of the latter fits into an axial recess in the chuck 34 and may be retained therein by means such as a set screw 35. Feeding of the spindle 32 and the electrode 26 may be effected either manually as by a hand crank 36 or automatically as by an electric feed motor 38 mounted on the radial arm. The hand crank 36 and feed motor 38 each rotates an internally threaded bevel pinion 39 which abuts the upper side of the radial arm 16 and engages the threads on the spindle 32 such that rotation of the pinion 39 in one direction raises the spindle and in the reverse direction lowers the spindle.

In certain machining operations it is also desirable to rotate the electrode 26 as well as translate it relative to the workpiece 19. For this purpose, rotation or angular oscillation of electrode may be provided by journaling the coaxial lower end portion 40 of the spindle 32 in needle, ball, or sleeve bearings 41 interposed between the lower portion and upper threaded portion of the spindle. The lower end portion 40 of the spindle and the electrode tool 26 may be rotated either manually or by an electric motor 42 mounted on the radial arm and driving the tool through a vertical drive shaft 44. A right angle drive 45, as by bevel gears on the motor shaft and the vertical drive shaft 44 together with suitable gearing on the lower end of the shaft 44 may be used to drivingly connect the electrode to the motor for rotary movement. The gearing at the lower end of the drive shaft 44 may be a pair of spur gears, or may be a worm gear drive arrangement.

To provide time-spaced electrical spark discharges between the electrode and the workpiece, a variety of electrical circuits may be used, and the present invention is not concerned with the circuit details. By way of illustration, the source of electric power shown diagrammatically in the drawings comprises a direct current source in the form of a generator G and an energy storage device in the form of a capacitor 46. The capacitor 46 is charged through an impedance represented by a resistor 48 and inductance 49. The output of the power circuit is taken from the terminals of the capacitor 46 and is represented by the electrical connectors 50, 51 being connected respectively to the electrode 26 and workpiece 19. For best results the workpiece 19 is connected to the positively charged terminal of the capacitor to become the spark gap anode and the electrode tool is connected to its negative terminal to become the spark gap cathode. The constants of the electrical circuit establish the rate of charge and discharge of the circuit and the repetition rate of spark discharges between the electrode and workpiece.

In accordance with the present invention, means are provided for conducting the time-spaced discharge currents, which may involve currents as high as twenty thousand amperes, from the power source to the electrode such that continuous and positive electrical contact is maintained even though the electrode may be moved relative to the workpiece. With connectors and couplers used heretofore, it has been found that the peculiar nature of the electrical current discharges caused rapid deterioration of the spindle or electrode at the power source connection, particularly where the spindle and electrode were rotated and a slip connection is required.

In carrying out the present invention, means are provided for establishing a conducting path to the spindle 32 or electrode 26 through a body of electrically conductive fluid 52. Preferably, mercury is utilized for this purpose for reasons to be discussed hereinafter. As seen in the drawing, means are provided for defining a fluid retaining cavity or chamber 53 which has an open side or area closed by the spindle 32 or shank of the electrode 26 so that fluid in the chamber is in surface engagement with the latter. In the preferred embodiment of the invention, the chamber or cavity 53 is of annular cross section having its outer face and end faces defined by a generally cylindrical casing 54 and its inner face defined by the peripheral surface of the spindle 32 or shank of the electrode 26.

In the form shown in Fig. 2, the casing is applied to the spindle 32 and comprises a tubular body 55 having an internal diameter substantially larger than the diameter of the spindle 32 so that an annular space is provided around the spindle. The ends of the tubular body 55 are closed by means of disks or rings 56 having a central bore corresponding in size to that of the spindle 32 and forming a close fit therewith. As shown in Fig. 2, the tubular body 55 and end disks 56 are of integral construction and when applied to the spindle define the preferred annularly shaped fluid chamber or cavity 53. The end disks or rings 56, while being in close fitting relation with the spindle, are provided with sufficient clearance to permit rotation or axial sliding of the spindle relative to the connector or coupler casing 54.

Means are also provided for electrically connecting the output of the power source to the entrapped fluid 52. For this purpose an electrically conducting path is provided through the tubular body or casing. In the form of connector shown in Figs. 2 and 3, the conducting path comprises a rod 58 of metallic or other conductive material, which is received in a suitably sized aperture in the side of the tubular body 55. The rod 58 is held in place by suitable fasteners such as nuts 59, 60 screwed on its inner and outer end portions. The nut 59 on the inner end portion of the rod is suitably shaped to conform to the cylindrical surface of the tubular body. By thus shaping the inner fastener, full surface engagement of the fastener and body is obtained and the fastener is held from turning by engagement with the inwardly bowed walls of the body. The second fastener 60 and washer 61 provided on the outer end portion of the rod 58 may be of any suitable construction. The outermost end of the rod is provided with any suitable terminal connection 62 for receiving the electrical conductor leading from the power circuit 12.

The electrical conducting rod 58 forming the electrical conductive path through the connector casing to the entrapped fluid 52 is positioned so that its inner end or the fastener 59 thereon do not contact the spindle 32. In addition, the conducting path through the casing is electrically insulated from the spindle so that the sole electrical connection between the power circuit and the relatively movable spindle is through the entrapped conductive fluid 52. In the form shown in Fig. 2, the tubular body is of insulating material such as a phenol-formaldehyde resin or other durable plastic to insure electrical conduction only through the fluid.

To permit filling of the fluid chamber or cavity 53, a filling opening 64 is provided in the casing 54. Preferably, the opening 64 is positioned such that the chamber may be filled completely with mercury or other conductive fluid to the exclusion of any air or gas. In the illustrative embodiment, a hole is drilled in the side of the connector or coupler casing 54 and extends from the outside of the casing radially inwardly to the fluid chamber 53. With the spindle and surrounding coupler tipped to a horizontal position and the filling opening 64 directed upwardly, the fluid may be poured into the opening. As the fluid level rises the air or gas in the chamber 53 will be completely displaced. After filling, the opening may be closed by any suitable stopper or closure to retain the fluid in the coupler.

In the preferred form of the invention, means are also provided for maintaining the fluid 52 under pressure in the chamber or cavity 53 to provide continuous and positive surface engagement between the fluid and both the inner end of the conducting path in the casing and the surface of the spindle 32. For this purpose, a pressurizing plunger 66 and means for retaining the plunger in an adjustably fixed position are provided. As shown in the drawing, the pressurizing plunger comprises a screw threaded plunger 66 which conveniently may be a common machine screw. With the fluid chamber completely filled with mercury or other conductive fluid, the plunger 66 may be pressed inwardly to pressurize the entrapped fluid. In the illustrated connector, the screw threads on the plunger serve both to force the plunger inwardly to apply pressure and to maintain the plunger in the desired inward pressurizing position.

The casing 54 as shown in the drawings has a substantial axial area exposed to the pressure applied to the entrapped fluid. The casing is thus subjected to a certain amount of distorting force which acts against the resilient force of the casing material and produces a slight deformation of the casing. As a result the resilient restoring force of the casing material tends to maintain the entrapped fluid under pressure and also to maintain intimate surface engagement between the fluid and both the inner end of the conducting path and the spindle surface.

It has been found that when mercury is utilized as the conductive fluid, the surface tension of the mercury is sufficiently great to permit sliding or rotative clearance between the end disks and the spindle without escape of the mercury, even when under pressure. Mercury has also been found highly desirable because of its stable and desirable electrical characteristics. The connector here described when used with mercury has proved highly satisfactory even when the extremely high currents of spark discharges of the electro-erosion process are passed through the coupler.

Referring now to Fig. 4 of the drawing, another form of connector or coupler embodying the present invention is illustrated. In this form the coupler casing 54 comprises a tubular body 68 of metallic or other conductive material. The use of a conductive tubular body increases the electrical contact surface between the fluid and the connection to the power supply circuit. In this instance, the conductive path through the coupler casing is provided by the conductive nature of the tubular body itself. A threaded terminal rod 69 may be provided on the tubular body 68 for connecting the same to the power supply circuit 12.

To provide closure for the ends of the conductive tubular body 68, insulating end support closures are provided to insulate the body 68 from the spindle 32 and to limit electrical conduction to paths through the entrapped fluid 52. For this purpose a pair of metallic disks or rings 70 with central bores are fitted over the spindle 32 adjacent the ends of the tubular body 68. The metallic rings 70 have a smaller outer diameter than the inner diameter of the tubular body 68, and interposed between the outer periphery of the metallic rings 70 and the inner surface of the body 68 are rings 71 of insulating material which complete the enclosure of the fluid chamber or cavity 53, and insulate the tubular body from the spindle 32.

As in the case of the form of coupling shown in Fig. 2, the form of Fig. 4 has closely fitting junctures between its end rings 70, 71, the spindle 32 and tubular body 68. At least one of these junctures, i. e., between metallic rings 70 and the spindle 32, between the insulating rings 71 and metallic rings 70, or between the tubular casing 68 and insulating rings 71, is provided with sufficient clearance to provide a sliding fit to permit rotation of the spindle relative to the coupler casing. If relative axial translation of the spindle is desired a sliding fit would preferably be provided between the metallic rings 70 and the spindle 32. The lead 50 to the coupling body may be made of well known flexible construction.

The illustrative connectors or couplers are shown in the drawing as applied to the spindle 32 of the apparatus for relative rotation thereof. In this instance the spindle is provided with a shoulder 73 which abuts one end face of the coupler and with a washer 74 which abuts the other end face of the coupler. A nut 75 engaging screw threads on the spindle 32 holds the washer 74 in engagement with the coupler casing 54. The shoulder 73 and washer 74 are of a diameter less than the outer diameter of the insulating rings, or are otherwise separated from the metallic tubular casing in the form shown in Fig. 4 to prevent establishing a conducting path around the body of entrapped fluid.

This shoulder and washer arrangement in addition to positioning the coupler aids in reducing any tendency for the fluid to escape from the casing 54. It will be understood that if relative axial movement is desired the shoulder and retainer nut on the spindle can be dispensed with.

If desired, any such mentioned tendency of the fluid to escape may also be reduced by the insertion of suitable packing at the junctures of the end closures. An O-shaped ring 77 of rubber or other elastic packing material for the purpose is shown in connection with the form of coupler of Fig. 2. It will be understood the same may also be used in the form of coupler of Fig. 4. By utilizing elastic packing material, the pressure exerted on the entrapped fluid tends to deform the packing, as well as the coupler casing, thus increasing both the effectiveness of the packing and the volume change of the cavity by elastic deformation of the containing vessel or casing.

I claim as my invention:

1. An electro-erosion apparatus comprising in combination an electrical power source, a frame, an electrode tool conductive spindle movable relative to the frame, means defining a bore slidably fitted around said movable spindle and also defining a cavity opening into said bore, a quantity of mercury sufficient to fill said cavity completely confined therein, said means having an electrical conducting path from the outside thereof to the said cavity, a terminal on the outer end portion of said conducting path for connecting the latter to the said electrical power source, said conducting path and said terminal being insulated from said spindle, and means for putting said quantity of mercury under pressure to provide continuous positive contact of said mercury with said spindle and the inner end portion of said conducting path.

2. In an electro-erosion apparatus having an electrical power source and a frame with a spark electrode tool conductive spindle movable relative to the frame, the combination comprising a housing having a bore therethrough to receive said spindle and define a slip fit therefor, said housing also defining a cavity opening into said bore, a quantity of mercury sufficient to fill said cavity confined therein, said means having an electrical conducting path from the outside thereof to the said cavity, and a terminal on the outer end portion of said conducting path for connecting the latter to the said electrical power source, said conducting path and said terminal being insulated from said spindle.

3. In an electro-erosion apparatus having an electrical power source and a frame with a tool supporting spindle movable relative to the frame, the combination comprising means defining a bore to receive said spindle and also defining an annularly shaped cavity opening into said bore and surrounding the same, a quantity of mercury sufficient to fill said cavity, and means having an electrical conducting path from the outside thereof to the said cavity, a terminal on the outer end portion of said conducting path for connecting the latter to the said electrical power source, said conducting path and said terminal being insulated from said spindle, and means including a plunger for putting said quantity of mercury under pressure to provide continuous positive contact of said mercury with said spindle and the inner end portion of said conducting path.

4. In an electro-erosion apparatus having an electrical power source and a frame with an electrode element rotatable relative to the frame, the combination comprising a tubular body surrounding said electrode element and having an internal diameter larger than the diameter of said electrode element, disk means on each end of said body having a central opening for receiving said electrode element and forming fluid tight junctures with said body and said electrode element but permitting relative rotation of the latter, said disk means and the inner surface of said tubular body forming with said electrode element a cylindrical cavity about the latter, a quantity of electrical conductive fluid in said cavity sufficient to fill said cavity, said tubular body having a conducting path between its outer surface and its inner surface in contact with said quantity of fluid, means for connecting said conducting path to said electrical power source, said conducting path and said connecting means being insulated from said electrode element, said tubular body defining an aperture for filling the said cavity with said quantity of fluid and a plunger associated with said aperture for closing the same and adapted to place said fluid under pressure to provide continuous positive electrical contact between said spindle and said conducting path through said fluid.

5. In an electro-erosion apparatus having an electrical power source and a frame with an electrode supporting spindle rotatable relative to the frame, the combination comprising a tubular body of electrically non-conducting material surrounding said spindle and having an internal diameter larger than the diameter of said spindle, a disk on each end of said body and integral therewith, said disks each having a central opening for receiving said spindle and forming a mercury tight fit therewith, said disks and the inner surface of said tubular body forming with said spindle an annularly shaped cavity about the latter, a quantity of mercury in the said cavity sufficient to fill said cavity, said tubular body having a conducting path between its outer surface and its inner surface in contact with said quantity of mercury, means for connecting said conducting path to said electrical power source, said conducting path and said connecting means being insulated from said spindle, said tubular body defining an aperture for filling the said cavity with said quantity of mercury and means associated with said aperture for closing the same to retain said mercury in said cavity to provide electrical contact between said spindle and said conducting path through said mercury.

6. In an electro-erosion apparatus having an electrical power source and a frame with an electrode supporting spindle movable relative to the frame, the combination comprising a cylindrical body of non-conducting material defining a longitudinal axial bore therethrough and an internal cavity opening to the said bore, the said bore being of a diameter to receive said spindle and form a snug fit therewith, but permitting relative movement of said body and said spindle, an electrical conductor extending from the outside of said body into said cavity and having means on its outer end for connecting the same to said electrical power source, said body also defining an opening from said cavity to the outside of said body for filling said cavity with an electrical conducting fluid to provide an electrical connection between said electrical conductor and said spindle, a plunger received in said opening for pressurizing said fluid upon inward movement of said plunger, and means for maintaining said plunger in pressurizing position to insure effective and continuous surface engagement of said fluid with said spindle and said electrical conductor.

7. An electro-erosion apparatus comprising in combination an electrical power source adapted to provide time-spaced electrical discharges, a machine frame having a spindle adapted to support an electrode and arranged for operative movement relative to said frame, a tubular body of conducting material surrounding a portion of said spindle, said body having an inner diameter larger than the diameter of said spindle, a pair of metallic rings pressed on said spindle and positioned adjacent the respective ends of said tubular body, a pair of rings of insulating material surrounding said metallic rings respectively and having a radial thickness sufficient to position their outer circumferential edges in close fitting engagement with the inner diameter of said tubular body, said tubular body and spindle together with said metallic and insulating rings forming a fluid tight chamber surrounding said spindle, a quantity of conductive fluid in said chamber sufficient to fill the latter, an aperture in said tubular body leading to said chamber to provide a filling opening for said fluid, and means for placing said fluid under pressure to insure continuous and positive electrical connection between said tubular body and said spindle through said fluid, at least one of the junctures between the tubular body, insulating rings, metallic rings and spindle respectively being a rotative sliding fit to permit rotation of said spindle relative to said tubular body.

8. An electro-erosion apparatus comprising in combination an electrical power source adapted to provide time-spaced electrical discharges, a machine frame having a spindle adapted to support an electrode and arranged for operative movement relative to said frame, a tubular body of conducting material surrounding a portion of said spindle, said body having an inner diameter larger than the diameter of said spindle, disk means having a central aperture for receiving said spindle and positioned adjacent the respective ends of said tubular body, said disk means being adapted to position said tubular body in spaced relation to said spindle and insulate said body from said spindle, said tubular body and spindle together with said disk means forming a fluid tight chamber surrounding said spindle, a quantity of conductive fluid in said chamber sufficient to fill the latter, an aperture in said tubular body leading to said chamber to provide a filling opening for said fluid, and means associated with said aperture for placing said fluid under pressure to insure continuous and positive electrical connection between said tubular body and said spindle through said fluid, said disk means being adapted to permit movement of said spindle relative to said tubular body.

9. In an electro-erosion apparatus having an electrical power source and a frame with an electrode supporting spindle rotatable relative to the frame, the combination comprising a tubular body surrounding said spindle and having an internal diameter larger than the diameter of said spindle, disk means on each end of said body having a central opening for receiving said spindle and having an elastic seal for forming a fluid tight fit with said spindle but permitting relative movement thereof, said disk means and the inner surface of said tubular body forming with said spindle a cylindrical cavity about the latter, a quantity of mercury in the said cavity sufficient to fill said cavity, said tubular body having a conducting path between its outer surface and its inner surface in contact with said quantity of mercury, means for connecting said conducting path to said electrical power source, said conducting path and said connecting means being insulated from said spindle, said tubular body defining an aperture for filling the said cavity with said quantity of mercury and a plunger associated with said aperture for closing the same and adapted to place said mercury under pressure to provide continuous positive electrical contact between said spindle and said conducting path through said mercury.

10. In electro-erosion apparatus having an electrical power source and a frame with an electrode supporting spindle movable relative to the frame, the combination comprising a cylindrical body of non-conducting material defining a longitudinal axial bore therethrough and an internal cavity opening to the said bore, the said bore being of a diameter to receive said spindle and form a sliding fit therewith, packing means between said spindle and the ends of said body to form a fluid tight seal, an electrical conductor extending from the outside of said body into said cavity and having means on its outer end for connecting the same to said electrical power source, said body also defining an opening from said cavity to the outside of said body for filling said cavity with an electrical conducting fluid to provide an electrical connection between said electrical conductor and said spindle, a plunger received in said opening for pressurizing said fluid upon inward movement of said plunger, and means for maintaining said plunger in pressurizing position to insure effective and continuous surface engagement of said fluid with said spindle and said electrical conductor.

References Cited in the file of this patent

UNITED STATES PATENTS

| | | |
|---|---|---|
| 2,019,971 | Hopkins | Nov. 5, 1935 |
| 2,066,588 | Taylor | Jan. 5, 1937 |
| 2,068,043 | Warncke | Jan. 19, 1937 |